US 9,386,215 B2

(12) United States Patent
Ono

(10) Patent No.: US 9,386,215 B2
(45) Date of Patent: Jul. 5, 2016

(54) DEVICE AND METHOD FOR MEASURING DISTANCES TO MULTIPLE SUBJECTS

(71) Applicant: FUJIFILM Corporation, Tokyo (JP)

(72) Inventor: Shuji Ono, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/664,936

(22) Filed: Mar. 23, 2015

(65) Prior Publication Data

US 2015/0195449 A1    Jul. 9, 2015

Related U.S. Application Data

(63) Continuation of application No. PCT/JP2013/075306, filed on Sep. 19, 2013.

(30) Foreign Application Priority Data

Sep. 24, 2012    (JP) .................... 2012-209799

(51) Int. Cl.
*H04N 5/232* (2006.01)
*G01B 11/14* (2006.01)
(Continued)

(52) U.S. Cl.
CPC ............ *H04N 5/23212* (2013.01); *G01B 11/14* (2013.01); *G02B 7/36* (2013.01);
(Continued)

(58) Field of Classification Search
CPC .......... H04N 5/23212; H04N 5/23293; H04N 5/2254; G01S 1/00; G01B 11/14; G03B 13/36; G06T 7/004; G02B 7/36
See application file for complete search history.

(56) References Cited

U.S. PATENT DOCUMENTS 8,345,144 B1 *   1/2013   Georgiev ........... H04N 5/23229
                                                         348/335
2007/0211164 A1 * 9/2007   Olsen .................... H04N 5/2353
                                                         348/345
(Continued)

FOREIGN PATENT DOCUMENTS

JP    2003-078802    3/2003
JP    2005-109622    4/2005
(Continued)

OTHER PUBLICATIONS

Written Opinion of the International Searching Authority PCT/JP2013/075306 dated Nov. 12, 2013.
(Continued)

*Primary Examiner* — Jason Flohre
(74) *Attorney, Agent, or Firm* — Young & Thompson

(57) ABSTRACT

A device for measuring distances to multiple subjects includes an imaging optical system, a pupil orientation sensor having multiple pixels including photoelectric conversion elements arranged two-dimensionally, the pupil orientation sensor selectively receiving a light flux passed through any of the multiple regions, an image acquisition device configured to simultaneously acquire each of multiple images corresponding to the multiple regions from the pupil orientation sensor, a focusing control device configured to independently drive the physically-separated multiple lenses of the imaging optical system on the basis of the multiple images acquired by the image acquisition device to control the lenses to be focused on multiple subjects each having a different focusing distance, and a first calculation device configured to calculate each of the focusing distances to the multiple subjects respectively subjected to focusing control by the focusing control device.

10 Claims, 11 Drawing Sheets

(51) Int. Cl.
*G03B 13/36* (2006.01)
*G06T 7/00* (2006.01)
*H04N 5/225* (2006.01)
*G02B 7/36* (2006.01)
*G01S 11/12* (2006.01)

(52) U.S. Cl.
CPC .............. *G03B 13/36* (2013.01); *G06T 7/004* (2013.01); *H04N 5/2254* (2013.01); *H04N 5/23293* (2013.01); *G01S 11/12* (2013.01)

(56) References Cited

U.S. PATENT DOCUMENTS

| | | | | |
|---|---|---|---|---|
| 2010/0085468 A1* | 4/2010 | Park | ................... | H04N 5/23296 348/345 |
| 2010/0110182 A1 | 5/2010 | Kanayama | | |
| 2010/0149389 A1* | 6/2010 | Goto | ................... | H04N 5/23212 348/280 |
| 2010/0150455 A1* | 6/2010 | Oyama | ................ | H04N 5/2254 382/219 |
| 2012/0044400 A1* | 2/2012 | Okada | ................ | H04N 5/23212 348/333.01 |
| 2013/0121615 A1* | 5/2013 | Intwala | ..................... | G06T 5/10 382/280 |

FOREIGN PATENT DOCUMENTS

| | | |
|---|---|---|
| JP | 2006-184065 | 7/2006 |
| JP | 2010-113043 | 5/2010 |
| JP | 2010-271429 | 12/2010 |
| JP | 2011-199755 | 10/2011 |

OTHER PUBLICATIONS

International Search Report PCT/JP2013/075306 dated Nov. 12, 2013.

* cited by examiner

DEVICE AND METHOD FOR MEASURING DISTANCES TO MULTIPLE SUBJECTS

CROSS-REFERENCE TO RELATED APPLICATIONS

This application is a Continuation of PCT International Application No. PCT/JP2013/075306 filed on Sep. 19, 2013, which claims priority under 35 U.S.C. §119(a) to Japanese Patent Application No. 2012-209799 filed on Sep. 24, 2012. Each of the above application(s) is hereby expressly incorporated by reference, in its entirety, into the present application.

BACKGROUND OF THE INVENTION

1. Field of the Invention

The present invention relates to a device and method for measuring distances to multiple subjects, and particularly to a technology for simultaneously measuring distances to multiple subjects or the like.

2. Description of the Related Art

Japanese Patent Application Laid-Open No. 2010-113043 (hereinafter referred to as PTL 1) describes an imaging system, during a live broadcast of a marathon race, calculating a distance to each runner (subject) or a distance between the subjects to display the distance in a live broadcast image. The imaging system calculates a subject distance in each of multiple ranging regions provided in a range to be imaged.

Japanese Patent Application Laid-Open No. 2010-271429 (hereinafter referred to as PTL 2) describes an image pickup apparatus includes two semicircular halves of lens, one of which constitutes an image pickup lens system for long distance and the other of which constitutes an image pickup lens system for short distance. The lenses of the image pickup lens system for long distance and the image pickup lens system for short distance are arranged such that an image of a subject at a long distance is formed on a half region of an image pickup element by the image pickup lens system for long distance and an image of a subject at a short distance is formed on a half region of the image pickup element by the image pickup lens system for short distance to simultaneously acquire the image for long distance and the image for short distance from the image pickup element.

Japanese Patent Application Laid-Open No. 2011-199755 (hereinafter referred to as PTL 3) describes an image pickup apparatus in which each of subject images passed thorough respective different regions on right and left side of an imaging lens is formed on an image pickup element to acquire a left eye view image and a right eye view image. The image pickup apparatus includes an image pickup element (pupil orientation sensor) having a light blocking member (pupil division device) for blocking a part of a light flux provided on each pixel of the image pickup element, and the left eye view image and the right eye view image are acquired from the pupil orientation sensor.

SUMMARY OF THE INVENTION

The imaging system described in PTL 1 brings into focus one subject (runner at the forefront) of multiple subjects (respective runners in a marathon race live broadcast) and cannot acquire an image in focus on each of the multiple subjects.

The image pickup apparatus described in PTL 2 can simultaneously pick up both an image for long distance and an image for short distance, but cannot determine a distance to a subject (main subject) in the images by using a single image pickup apparatus. For this reason, to detect the subject distance, the image pickup apparatus described in PTL 2 needs to be configured as a stereo camera apparatus with image pickup apparatuses spaced apart at a predetermined distance.

The image pickup apparatus described in PTL 3 can acquire from the pupil orientation sensor the left eye view image and the right eye view image different in parallax depending on the subject distance, but cannot pick up an image in focus on multiple subjects each having a different subject distance.

The present invention has been made in consideration of such circumstances and has an object to provide a device and method for measuring distances to multiple subjects capable of simultaneously acquiring multiple images focused on multiple subjects different in a subject distance (focusing distance) by one image pickup apparatus and measuring the focusing distances to the multiple subjects.

In order to achieve the above object, a device for measuring distances to multiple subjects according to an aspect of the present invention includes an imaging optical system including physically-separated multiple lenses, multiple regions of the imaging optical system each having an independent focusing distance corresponding to a combination of the multiple lenses, a pupil orientation sensor having multiple pixels including photoelectric conversion elements arranged two-dimensionally, the pupil orientation sensor selectively receiving a light flux passed through any of the multiple regions, an image acquisition device configured to simultaneously acquire each of multiple images corresponding to the multiple regions from the pupil orientation sensor, a focusing control device configured to independently drive the physically-separated multiple lenses of the imaging optical system on the basis of the multiple images acquired by the image acquisition device to control the lenses to be focused on multiple subjects each having a different focusing distance, and a first calculation device configured to calculate each of the focusing distances to the multiple subjects respectively subjected to focusing control by the focusing control device.

According to an aspect of the present invention, one image pickup apparatus including a single imaging optical system and a pupil orientation sensor can simultaneously pick up the images respectively focused on the multiple subjects and can simultaneously measure the distances to the multiple subjects on the basis of the information in the focusing control.

It is preferable that the device for measuring distances to multiple subjects according to another aspect of the present invention include a second calculation device configured to calculate a distance between the multiple subjects on the basis of the multiple focusing distances calculated by the first calculation device. This allows the distance between the multiple subjects to be easily determined.

In the device for measuring distances to multiple subjects according to further another aspect of the present invention, it is preferable that the image acquisition device simultaneously and successively acquire each of the multiple images corresponding to the multiple regions, the focusing control device independently drive the physically-separated multiple lenses of the imaging optical system on the basis of the multiple images corresponding to the multiple regions which are simultaneously and successively acquired by the image acquisition device to control the lenses to be successively focused on the multiple subjects, the first calculation device successively calculate the focusing distances to the multiple subjects each successively subjected to the focusing control by the focusing control device, and the second calculation device successively calculate the distance between the multiple subjects on the basis of the multiple focusing distances which are successively calculated by the first calculation device. This allows the distance between the multiple subjects to be always measured even if the multiple subjects separately move.

It is preferable that the device for measuring distances to multiple subjects according to still another aspect of the present invention include a composite image generation device configured to generate a composite image in which at least in-focus images of the multiple subjects are composited on the basis of the multiple images simultaneously acquired by the image acquisition device from the pupil orientation sensor. This makes it possible to observe the subject images respectively focused on the multiple subjects different in the focusing distance in a focused image in one screen, not losing sight of the multiple subjects.

In the device for measuring distances to multiple subjects according to still another aspect of the present invention, it is preferable to generate a composite image in which at least in-focus images of the multiple subjects are composited on the basis of the multiple images simultaneously acquired by the image acquisition device from the pupil orientation sensor, and superimpose, on the composite image, character information indicating the distance between the multiple subjects calculated by the second calculation device. This allows the distance between the multiple subjects to be confirmed in real time.

It is preferable that the device for measuring distances to multiple subjects according to still another aspect of the present invention include a subject detection device configured to detect a main subject from each of the multiple images simultaneously acquired by the image acquisition device, in which with assuming that each region containing each of the subjects detected by the subject detection device and in the multiple images simultaneously acquired by the image acquisition device is a focal point detection region, the focusing control device independently drives the physically-separated multiple lenses of the imaging optical system on the basis of an image of each focal point detection region to control the lenses to be successively focused on the multiple subjects. This makes it possible to track each of the multiple subjects while acquiring the image focused on each of the multiple subjects and the focusing distance.

In the device for measuring distances to multiple subjects according to still another aspect of the present invention, it is preferable that the focusing control device independently drive the physically-separated multiple lenses of the imaging optical system such that a contrast of the image in each focal point detection region is maximized and controls the lenses to be successively focused on the multiple subjects.

In the device for measuring distances to multiple subjects according to still another aspect of the present invention, it is preferable that the first calculation device have a lens position detection device configured to detect lens positions of the multiple lenses which are independently driven by the focusing control device so as to be brought into focus, and calculate the focusing distances to the multiple subjects on the basis of the lens positions of the multiple lenses detected by the lens position detection device. This allows the focusing distances to the multiple subjects to be calculated in conjunction with the focusing control by the focusing control device. The lens position detection device may directly detect the lens positions of the multiple lenses or may detect from each drive instruction made to a drive device configured to drive each of the multiple lenses.

A method for measuring distances to multiple subjects according to still another aspect of the present invention includes an image acquisition step of simultaneously acquiring each of multiple images corresponding to multiple regions from an image pickup device, the image pickup device having an imaging optical system including physically-separated multiple lenses, multiple regions of the imaging optical system each having an independent focusing distance corresponding to a combination of the multiple lenses, and a pupil orientation sensor having multiple pixels including photoelectric conversion elements arranged two-dimensionally, the pupil orientation sensor selectively receiving a light flux passed through any of the multiple regions, a focusing control step of independently driving the physically-separated multiple lenses of the imaging optical system on the basis of the multiple images acquired in the image acquisition step to control the lenses to be focused on multiple subjects each having a different focusing distance, and a first calculation step of calculating each of the focusing distances to the multiple subjects respectively subjected to focusing control in the focusing control step.

It is preferable that the method for measuring distances to multiple subjects according to still another aspect of the present invention include a second calculation step of calculating a distance between the multiple subjects on the basis of the multiple focusing distances calculated in the first calculation step.

According to the present invention, multiple images focused on multiple subjects different in a focusing distance can be simultaneously acquired by one image pickup apparatus and the focusing distances to the multiple subjects, a distance between the multiple subjects and the like can be measured.

DETAILED DESCRIPTION OF THE PREFERRED EMBODIMENTS

Hereinafter, embodiments of a device and method for measuring distances to multiple subjects according to the present invention will be described with reference to the accompanying drawings.

<Outer Appearance of Device for Measuring Distances to Multiple Subjects>

Figure 1:
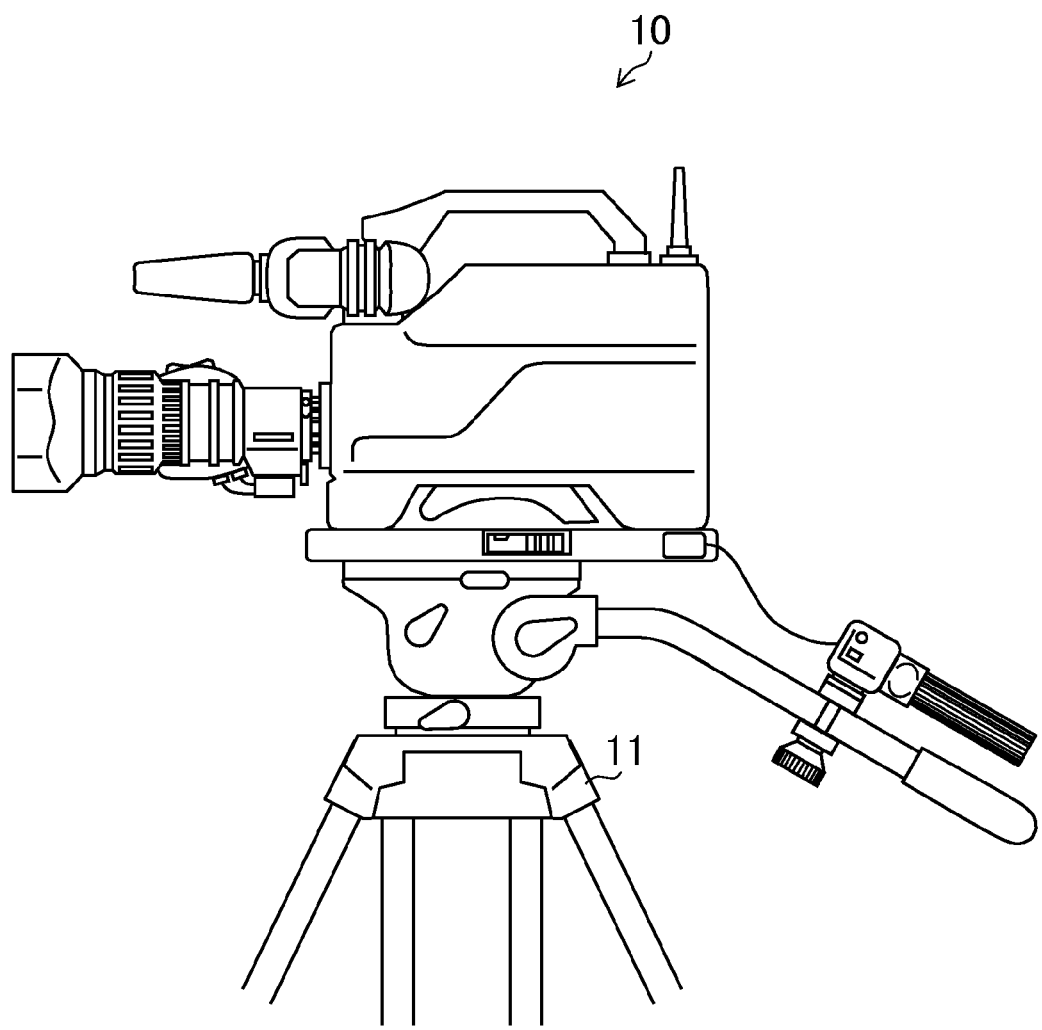
FIG. 1 is an outer appearance view showing an embodiment of an image pickup apparatus applied as a device for measuring distances to multiple subjects according to the present invention.

FIG. 1 is an outer appearance view showing an embodiment of an image pickup apparatus (e.g., TV camera) 10 applied as a device for measuring distances to multiple subjects according to the present invention. In a case where the multiple subjects are respective runners in a marathon race or relay road race, the image pickup apparatus 10 is preferably mounted on a first mobile unit vehicle (e.g., mobile unit vehicle at the forefront in the marathon race or relay road race) with being attached to a tripod 11.

Figure 2:
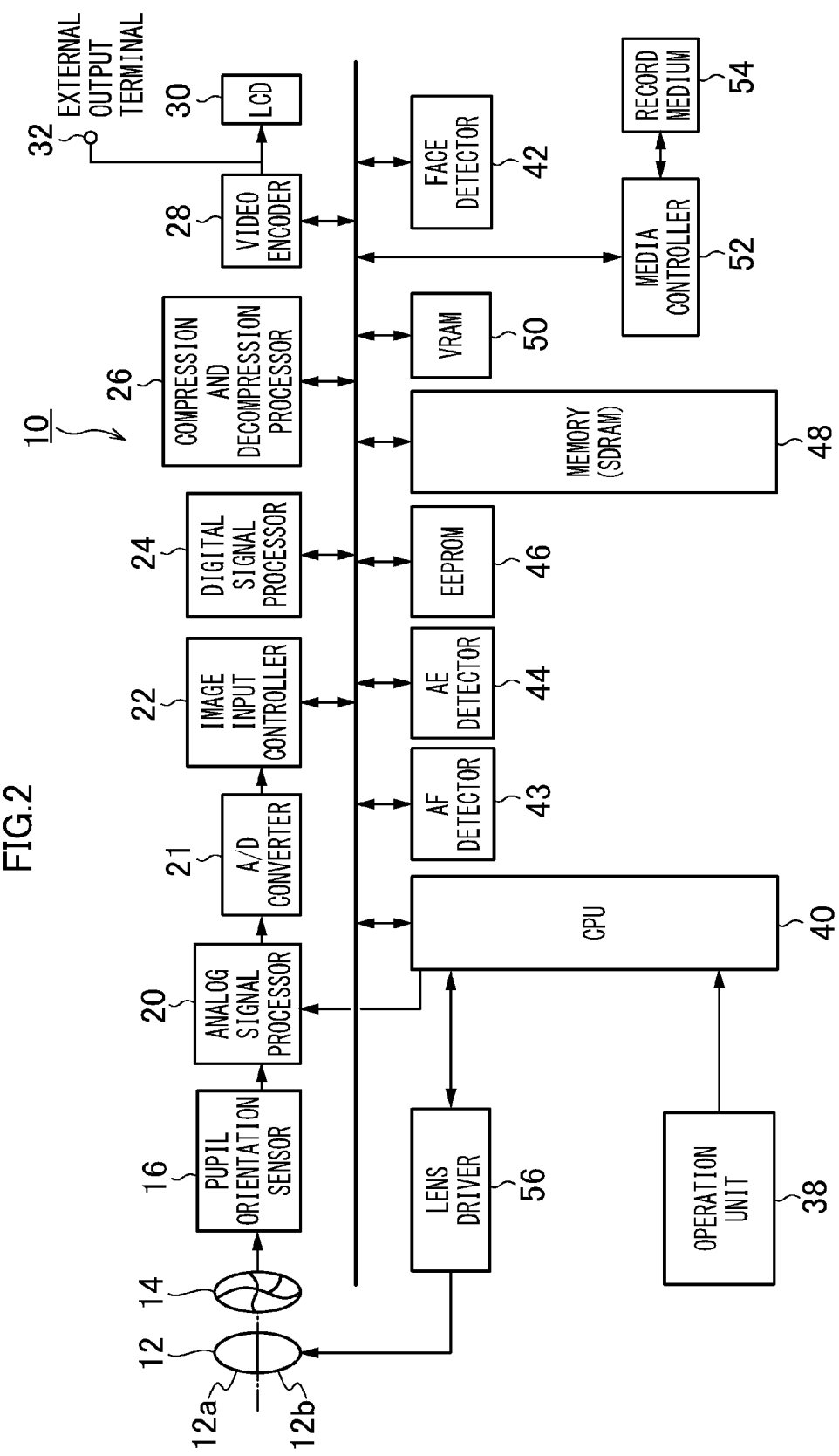
FIG. 2 is a block diagram illustrating an embodiment of an internal configuration of the image pickup apparatus shown in FIG. 1.

FIG. 2 is a block diagram illustrating an embodiment of an internal configuration of the image pickup apparatus 10.

This image pickup apparatus 10 transmits a picked-up moving picture via an external output terminal 32 to a wireless transmitter (not shown). The image pickup apparatus 10 records the picked-up moving picture in a record medium 54 and simultaneously measures distances to the multiple subjects and the like to output a measurement result.

Figure 3A:
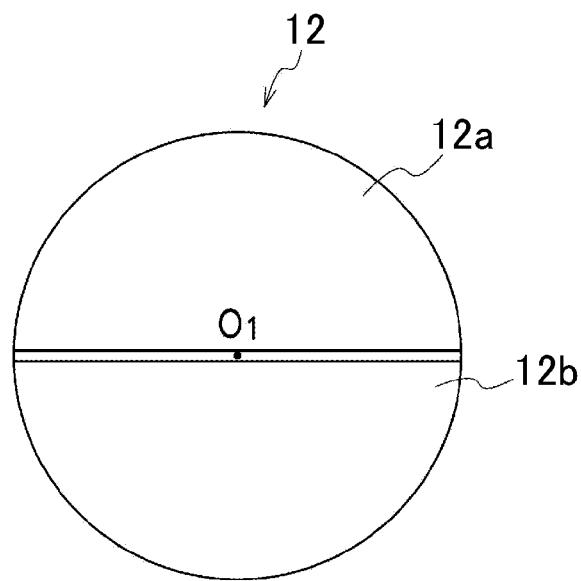
FIG. 3A is a front view showing an embodiment of a segmented lens applied to the image pickup apparatus shown in FIG. 1.
Figure 3B:
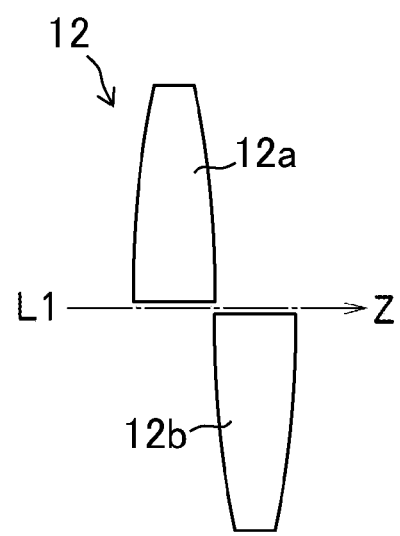
FIG. 3B is a lateral view showing an embodiment of the segmented lens applied to the image pickup apparatus shown in FIG. 1.
Figure 4:
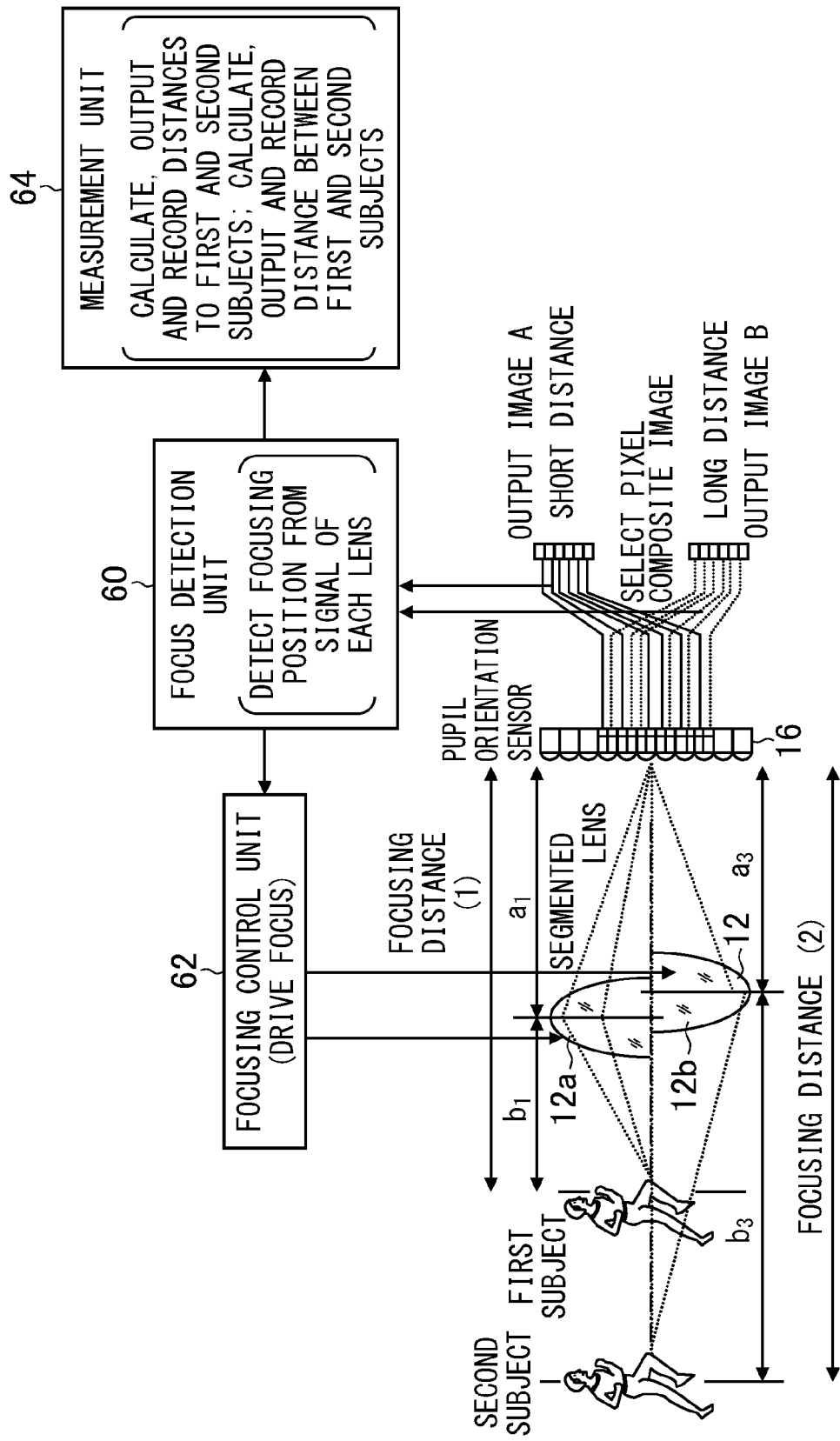
FIG. 4 is a main part configuration diagram of an image pickup apparatus including a segmented lens and a pupil orientation sensor.

FIG. 3A and FIG. 3B are a front view and a lateral view respectively showing an embodiment of an imaging optical system (segmented lens) 12 applied to the image pickup apparatus 10, and FIG. 4 is a main part configuration diagram of the image pickup apparatus 10 including the segmented lens 12 and an image pickup element (pupil orientation sensor) 16 (image acquisition device) applied to the image pickup apparatus 10.

As shown in FIG. 3A and FIG. 3B, the segmented lens 12 includes half-moon-shaped lens parts 12a and 12b obtained by physically dividing one lens with respect to a lens center $O_1$ into two halves horizontally and the respective lens parts 12a and 12b are provided so as to be movable relatively in a direction of a light axis L1.

The lens parts 12a and 12b each are independently driven by a lens driver 56 (FIG. 2) to control lens positions so as to focus on two subjects different in a focusing distance (main subject). This can change the focusing distances of the lens parts 12a and 12b. Focusing control for the lens parts 12a and 12b is described later in detail.

As shown in FIG. 4, the lens part 12a, which is positioned more forward than the lens part 12b (on a subject side), has a focusing distance (1) for focusing on a first subject on a short distance side, whereas the lens part 12b has a focusing distance (2) for focusing on a second subject on a long distance side.

Figure 5:
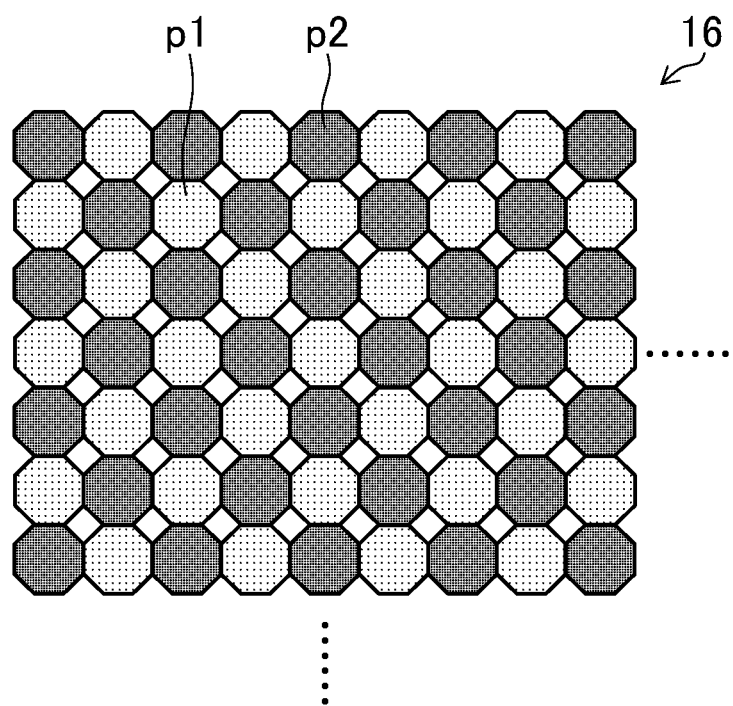
FIG. 5 is a plan view of the pupil orientation sensor.

FIG. 5 is a plan view of the pupil orientation sensor 16. As shown in FIG. 5, the pupil orientation sensor 16 has multiple pixels (pixel group of pixel p1, pixel group of pixel p2) including photoelectric conversion elements arranged two-dimensionally. The pixel group of pixel p1 is configured to selectively receive the light flux passed through the lens part 12a and the pixel group of pixel p2 is configured to selectively receive the light flux passed through the lens part 12b.

Figure 6A:
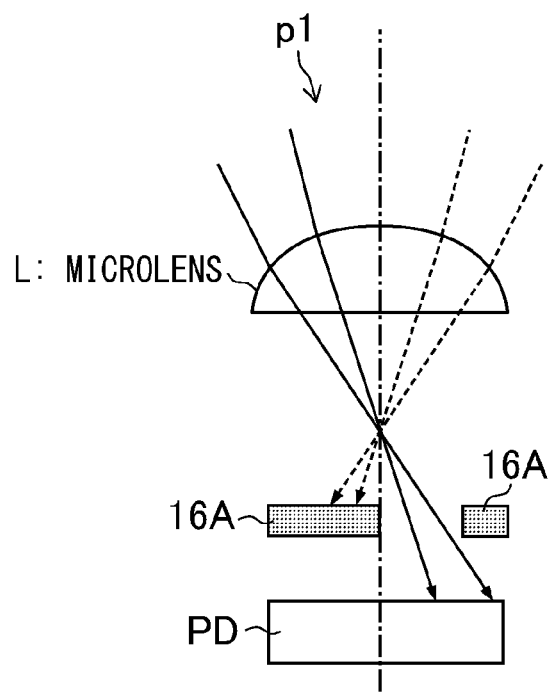
FIG. 6A is a main part sectional view showing a configuration of the pupil orientation sensor.
Figure 6B:
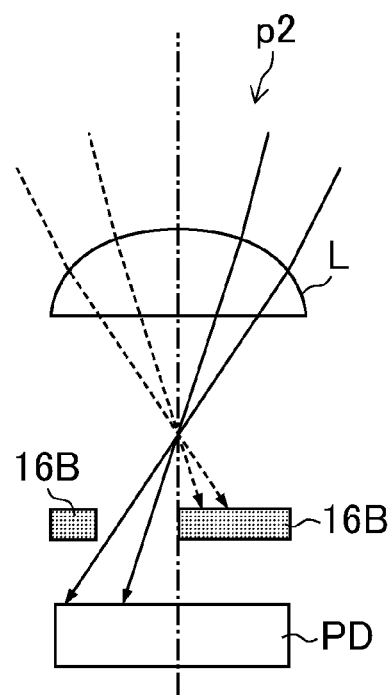
FIG. 6B is a main part sectional view showing a configuration of the pupil orientation sensor.

FIG. 6A and FIG. 6B each are a main part sectional view showing a configuration of the pupil orientation sensor 16. As shown in FIG. 6A and FIG. 6B, the pixel p1 has a light blocking member 16A provided on a front side of a photodiode PD (microlens L side) and the pixel p2 has a light blocking member 16B provided on the front side of the photodiode PD. The microlens L and the light blocking members 16A and 16B have a function as pupil division device. The light blocking member 16A has an opening for making incident only a light flux passed through the lens part 12a of the segmented lens 12 on a light receiving surface of the photodiode PD and the light blocking member 16B has an opening for making incident only a light flux passed through the lens part 12b of the segmented lens 12 on the light receiving surface of the photodiode PD.

This allows images to be read out respectively from the pixel group of pixel p1 and the pixel group of pixel p2 of the pupil orientation sensor 16 such that an output image A focused on the first subject and an output image B focused on the second subject are simultaneously acquired as shown in FIG. 4.

Referring back to FIG. 2, a general operation of the apparatus is overall controlled by a central processing unit (CPU) 40.

The image pickup apparatus 10 is provided with an operation unit 38 for picture recording start and the like. A signal from the operation unit 38 is input to the CPU 40, and the CPU 40 controls each circuit of the image pickup apparatus 10 on the basis of the input signal to perform picture recording operation control, image processing control, distance measurement, image data storing/reproducing control, display control of a liquid crystal display monitor (LCD: Liquid Crystal Display) 30 and the like, for example.

In recording a picture, the lens parts 12a and 12b of the segmented lens 12 of which the lens positions are independently controlled by the lens driver 56 are made to be focused on the first subject and the second subject each having a different focusing distance. A subject light passed through each of the lens parts 12a and 12b is formed into an image via a diaphragm 14 on the pupil orientation sensor 16. The pupil orientation sensor 16 performs reading out control of the image at a predetermined time interval (frame rate for the moving picture). This allows the image A focused on the first subject and the image B focused on the second subject to be simultaneously and successively acquired as shown in FIG. 4.

Output signals of the image A and the image B read out from the pupil orientation sensor 16 undergo a correlation double sampling process by an analog signal processor 20 to be sampled and held as an image signal (voltage signal) for each pixel and amplified, and then, added to an A/D converter 21. The A/D converter 21 converts the image signal input sequentially into a digital signal to be output to the image input controller 22. Some pupil orientation sensors 16 of a MOS (Metal Oxide Semiconductor) type may have the A/D converter built therein, and in such a case, the digital signal is directly output from the pupil orientation sensor 16.

Image data of two images simultaneously picked up which each have a different focusing distance can be acquired by selecting a pixel position for reading out pixel data from the pupil orientation sensor 16, but all pixel data may be read out from the pupil orientation sensor 16 to transiently store in a memory (SDRAM: Synchronous Dynamic Random Access Memory) 48 so that the image data of two images different in the focusing distance is extracted from the memory 48.

A digital signal processor 24 subjects a digital image signal input via the image input controller 22 to predetermined signal processing such as an offset process, gain control processing including white balance correction and sensitivity correction, gamma correction processing, YC processing and the like.

The image data processed by the digital signal processor 24 is input to a VRAM (Video Random Access Memory) 50. The image data read out from the VRAM 50 is encoded in a video encoder 28 to be output to liquid crystal display monitor 30 (LCD) provided on a back side of the camera. This causes the subject image to be displayed on a display screen of the liquid crystal display monitor 30 (LCD). In this case, two moving pictures different in the focusing distance may be simultaneously displayed, any one of the moving pictures may be displayed, or a composite image in which the respective images in focused regions of two moving pictures are composited may be displayed as described later.

The CPU 40, when instructed from the operation unit 38 to prepare or start picture recording, causes a face detector 42 (subject detection device) to perform face detection (subject detection). The face detector 42, including an image matching circuit and a face image template which are not shown, detects a face of the subject (person) contained in the imaged picture and outputs information on a position and size of the face to the CPU 40. In other words, the image matching circuit of the face detector 42 moves the largest target region for detecting a predefined face region little by little in the screen to check correlation with the face image template. Then, if a correlation score exceeds a predefined threshold, that target region is recognized as the face region. Subsequently, the target region is set to be slightly smaller to again check the correlation with the face image template. This operation is repeated until the smallest detection region to be detected for finding the face region. Information on the face region found in this way (information indicating a size and position of the face region) is output to the CPU 40. A face detection method is not limited to the above example, and a well-known method may be used such as a face detection method by edge detection or shape pattern detection, a face detection method by hue detection or skin color detection and the like.

The CPU 40 sets the largest face region and the next largest face region as focal point detection regions (auto focus (AF) regions) of two images to be simultaneously picked up on the basis of the face region information added by the face detector 42.

An AF detector 43 integrates a high-frequency component in the image signal of each of AF regions (face regions) of two images A and B set by the CPU 40 to output a so-obtained integrated value as an AF evaluation value to the CPU 40. The CPU 40 performs focusing control (so-called hill climbing control) by contrast AF for controlling the lens positions of the lens parts 12*a* and 12*b* via the lens driver 56 such that the AF evaluation value input from the AF detector 43 keeps a peak value.

The CPU 40, when instructed from the operation unit 38 to prepare or start picture recording, starts an automatic exposure (AE) operation such that the image data output from the A/D converter 21 is taken by an AE detector 44. The AE detector 44 integrates the image signals of the AF regions (face regions) of two images simultaneously acquired or the image signals of the overall screen to output a so-obtained integrated value to the CPU 40. The CPU 40 calculates luminance of the subject (image exposure value) by use of the integrated value input from the AE detector 44 and determines an aperture value of the diaphragm 14 on the basis of the image exposure value so as to control the diaphragm 14 on the basis of the determined aperture value or perform gain control in the analog signal processor 20.

Two images A and B subjected to the AF control and the AE control as above are read out from the pupil orientation sensor 16 at a predetermined time interval to be input to via the A/D converter 21 and the image input controller 22 and transiently stored in the memory 48. The image data of two images A and B transiently stored in the memory 48 is adequately read out by the digital signal processor 24, and the image data processed in the digital signal processor 24 is input to the VRAM 50. The image data read out from the VRAM 50 is encoded by the video encoder 28 to be output to the liquid crystal display monitor 30 (LCD) provided on the back side of the camera and output via the external output terminal 32 to an external device (wireless transmitter or the like).

The digital signal processor 24 performs a predetermined signal processing including generation processing (YC processing) of luminance data Y and color difference data Cr and Cb of the image data. The image data (YC data) subjected to the YC processing is again stored in the memory 48 and thereafter output to a compression and decompression processor 26 to be compressed into a moving picture compression format such as MPEG (Moving Picture Experts Group)-4. Moving picture files respectively for two compressed images A and B distinguished by the focusing distance, or one moving picture file obtained by compositing two images A and B distinguished by the focusing distance is recorded in the record medium 54 via a media controller 52. This makes it possible to record two moving pictures different in the focusing distance which are obtained by simultaneous moving picture imaging or one composited moving picture thereof.

An EEPROM (Electrically Erasable and Programmable Read Only Memory) 46 has recorded therein, in addition to a control program executed by the CPU 40, various pieces of data required for control and the like.

[Measuring Distances to Multiple Subjects]

Next, a description is given of a multiple subjects distance measurement section for measuring distances or the like of the first and second subjects in two images A and B different in the focusing distance picked up as above.

The distance measurement section shown in FIG. 4 mainly includes a focus detection unit 60, focusing control unit 62, and measurement unit 64.

The focus detection unit 60 (focusing control device) which includes e.g., the CPU 40, face detector 42, and AF detector 43 shown in FIG. 2 performs focus detection for two images A and B on the basis of two images A and B acquired by the pupil orientation sensor 16. In a case where one or both of two images A and B are out of focus, the focus detection unit outputs an instruction signal to the focusing control unit 62 to move each of the lens parts 12*a* and 12*b* of the segmented lens 12 to a lens position (focusing position) corresponding to each focusing distance of two images A and B.

The focusing control unit 62 (focusing control device), which corresponds to the lens driver 56 shown in FIG. 2, independently drives the lens parts 12*a* and 12*b* on the basis of the instruction signal input from the focus detection unit 60 to move to the lens positions focused on the first and second subjects different in the focusing distance.

The focus detection unit 60 outputs a current lens position instruction for each of the lens parts 12*a* and 12*b* at a time when each of two images A and B acquired by the pupil orientation sensor 16 is in a focusing state to the measurement unit 64 as information indicating the lens position of each of the lens parts 12*a* and 12*b*. For example, if a pulse motor is used as drive device of the focusing control unit 62, the focus detection unit 60 outputs a pulse signal for driving the pulse motor to the focusing control unit 62. A count value obtained by counting the pulse number of the pulse signal from a reference position (home position) of the lens parts 12a and 12b is the lens position instruction corresponding to each of current lens positions of the lens parts 12a and 12b.

The measurement unit 64 (first calculation device, second calculation device, lens position detection device) corresponds to the measure function of the CPU 40 shown in FIG. 2. The measurement unit 64 acquires the lens position information on each of the lens parts 12a and 12b being in the focusing state from the focusing control unit 62 to calculate distances to the first and second subjects in the images A and B on the basis of the lens position information. Since the distances to the first and second subjects (focusing distances (1) and (2)) respectively correspond to the lens positions of the lens parts 12a and 12b, each of the distances to the first and second subjects can be calculated from the lens position information on the lens parts 12a and 12b.

The measurement unit 64 also calculates a distance between the first and second subjects. The distances to the first and second subjects and the distance between the first and second subjects calculated in this way are adequately output and recorded.

[Method for Measuring Distances to Multiple Subjects]

Figure 7:
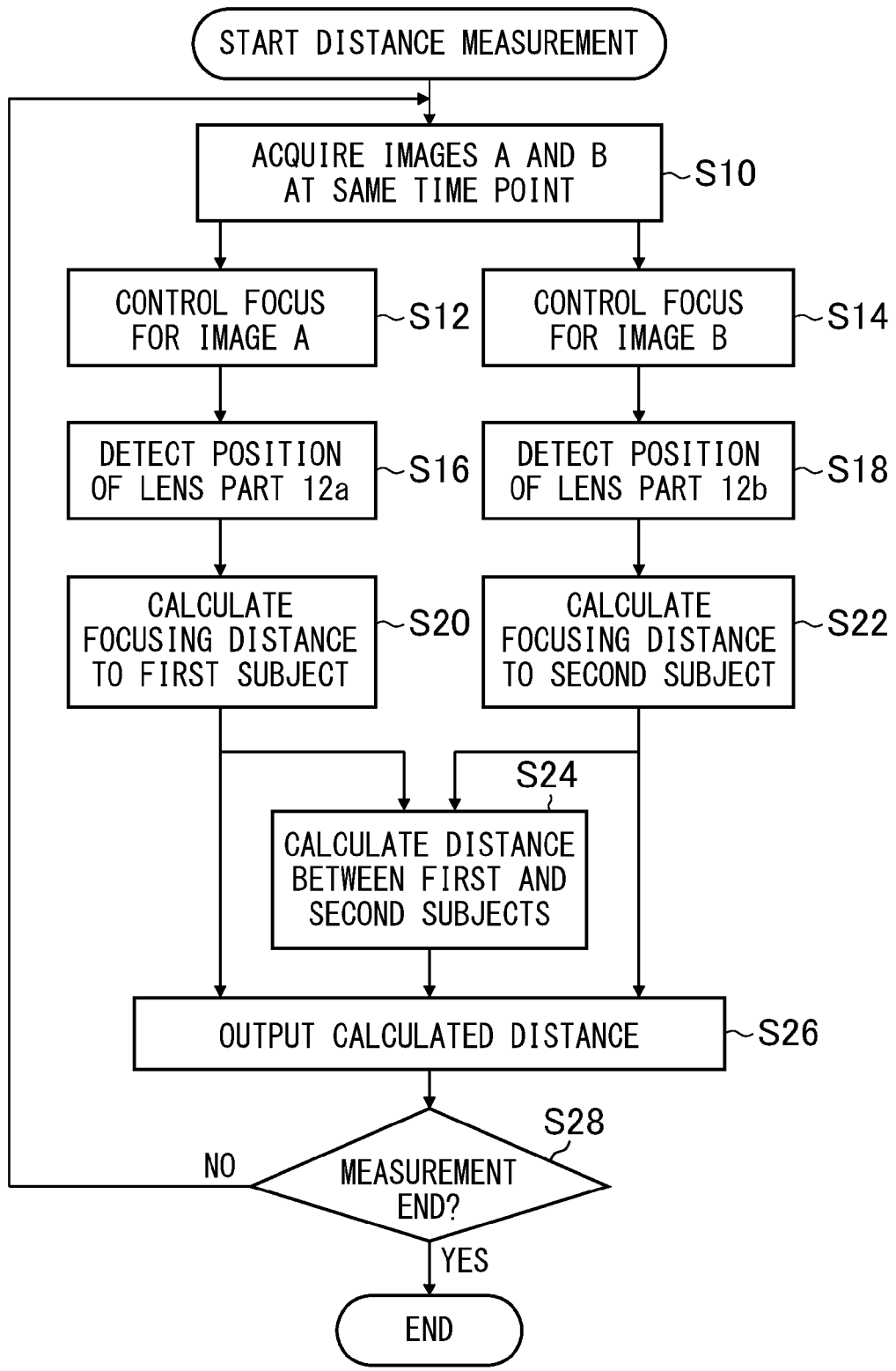
FIG. 7 is a flowchart used for describing a method for measuring distances to multiple subjects.

Next, a description is given of a method for measuring distances to multiple subjects with reference to a flowchart shown in FIG. 7.

In FIG. 5, the focus detection unit 60, focusing control unit 62, and measurement unit 64 shown in FIG. 4 perform processes below.

First, the focus detection unit 60 acquires the images A and B picked up at the same time point via the pupil orientation sensor 16 (step S10).

The focus detection unit 60 and the focusing control unit 62 perform the focusing control on the lens parts 12a and 12b on the basis of the images A and B (steps S12 and S14).

Figure 8A:
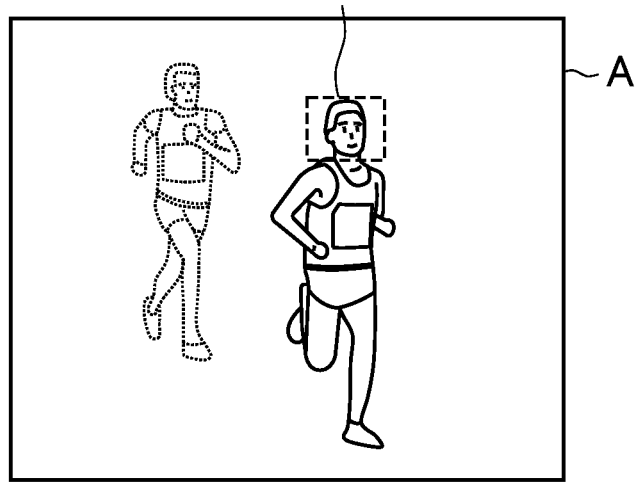
FIG. 8A is an image illustration of two images simultaneously picked up which are different in a focusing distance.
Figure 8B:
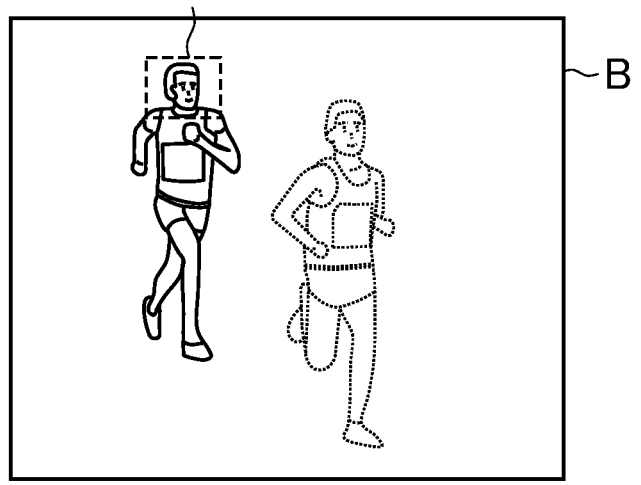
FIG. 8B is an image illustration of two images simultaneously picked up which are different in a focusing distance.

FIG. 8A and FIG. 8B are illustrations respectively showing the images A and B subjected to the focusing control. As shown in FIG. 8A and FIG. 8B, the image A is focused on the first subject (face), and the image B is focused on the second subject (face).

Subsequently, the focus detection unit 60 detects each of the lens positions of the lens parts 12a and 12b under the focusing control (steps S16 and S18).

Figure 9A:
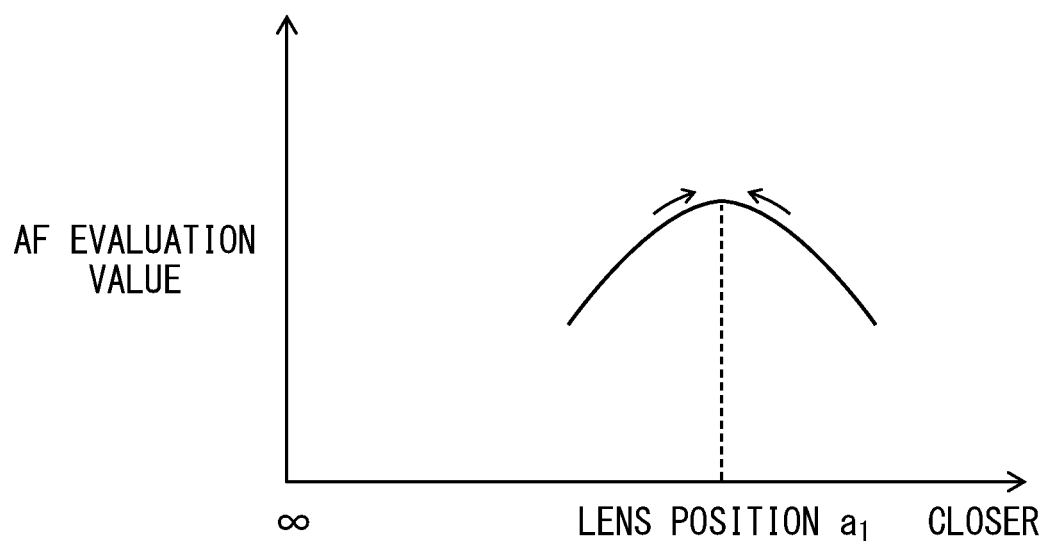
FIG. 9A is a graph illustrating an AF evaluation value in an AF region of each of two images simultaneously picked up which are different in a focusing distance.
Figure 9B:
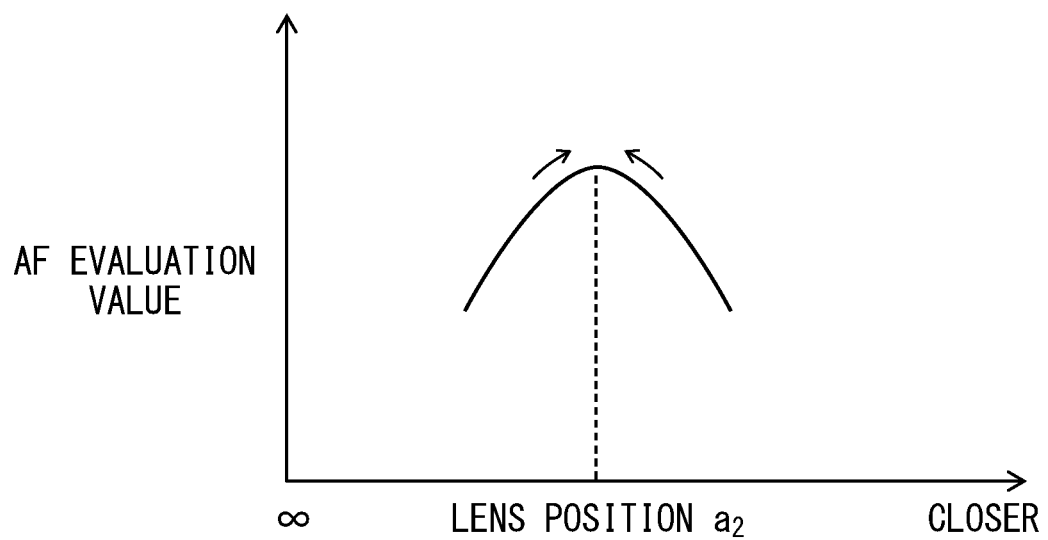
FIG. 9B is a graph illustrating an AF evaluation value in an AF region of each of two images simultaneously picked up which are different in a focusing distance.

FIG. 9A and FIG. 9B are graphs respectively illustrating the AF evaluation values of AF regions (face regions of the first and second subjects) in the images A and B. The focus detection unit 60, which controls the lens positions of the lens parts 12a and 12b (hill climbing control) such that the AF evaluation value of each AF region is always the peak value, can detect the current lens positions $a_1$ and $a_2$ of the lens parts 12a and 12b, respectively.

Next, the measurement unit 64 calculates the distances to the first and second subjects (focusing distances) on the basis of the lens position information indicating the lens positions $a_1$ and $a_2$ of the lens parts 12a and 12b input from the focus detection unit 60 (steps S20 and S22), and calculates the distance between the first and second subjects by finding a difference between the calculated distances to the first and second subjects (step S24).

The measurement unit 64 outputs the distances to the first and second subjects and distance between the first and second subjects calculated as above (step S26).

Next, the CPU 40 determines whether or not distance measurement ends (step S28), and if it does not end (in the case of "No"), returns the process to step S10 to acquire the images A and B at the next time point simultaneously picked up at a predetermined time interval. In this way, the above process from step S10 to step S28 is repeated.

On the other hand, at step S28, if it is determined that the distance measurement ends (in the case of "Yes"), measuring the distances to the multiple subjects ends.

As described above, it is possible to measure the distances to the first and second subjects and the distance between the first and second subjects varying from moment to moment at a predetermined time interval.

[Composite Image Generation Section]

Next, a description is given of a composite image generation section compositing the images A and B and superimposing distance information on the resultant image.

Figure 10:
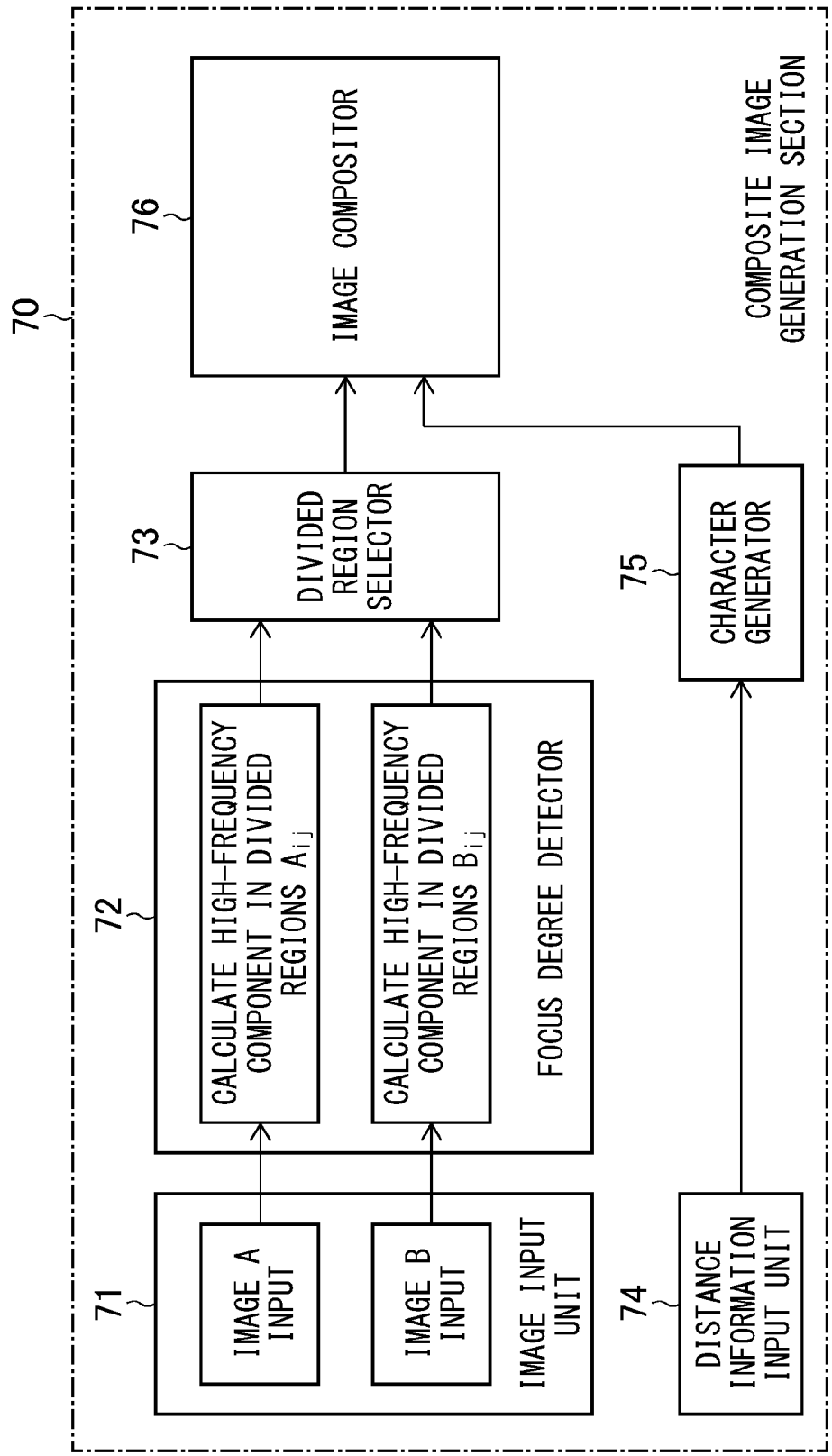
FIG. 10 is a block diagram illustrating an embodiment of a composite image generation section.

FIG. 10 is a block diagram illustrating an embodiment of a composite image generation section 70.

The composite image generation section 70 (composite image generation device), which includes the digital signal processor 24 and CPU 40 shown in FIG. 2, mainly has an image input unit 71, focus degree detector 72, divided region selector 73, distance information input unit 74, character generator 75, and image compositor 76.

The image input unit 71 receives the images A and B focused on the first and second subjects respectively (see FIG. 8A and FIG. 8B) and outputs the received images A and B to the focus degree detector 72.

The focus degree detector 72 divides each screen of the received images A and B into multiple divided regions $A_{ij}$ and $B_{ij}$ (e.g., 16×16 divided regions) to calculate an integrated value of the high-frequency component of a divided image in the divided region (focus degree information) for each of the divided regions $A_{ij}$ and $B_{ij}$. The divided image for each of the divided regions $A_{ij}$ and $B_{ij}$ together with the focus degree information on the calculated divided image are output to the divided region selector 73.

The divided region selector 73 selects divided images having a higher degree of focus from among divided images of the same divided regions of the divided regions $A_{ij}$ and $B_{ij}$ on the basis of the focus degree information and outputs the selected divided images to the image compositor 76.

Figure 11:
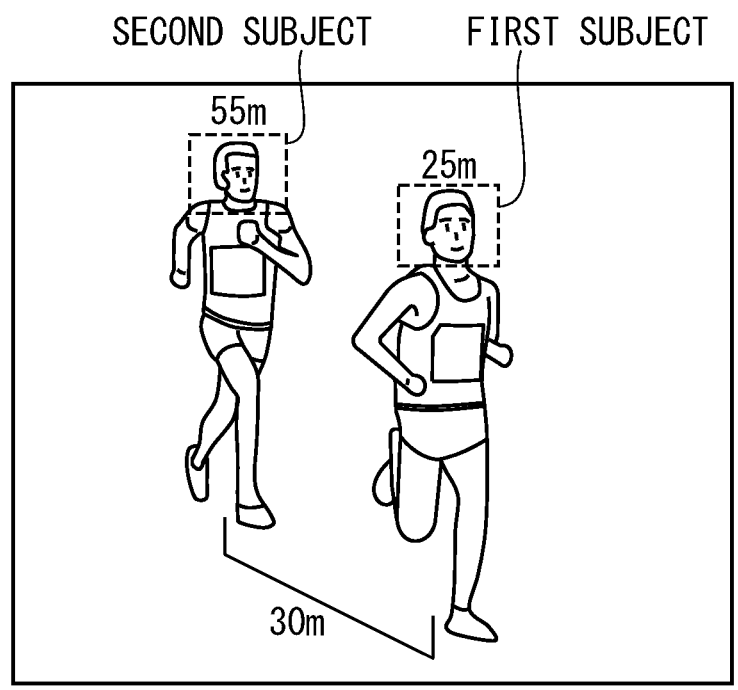
FIG. 11 is an image illustration of a composite image generated by the composite image generation section.

The image compositor 76 composites the respective divided images selected by the divided region selector 73 to generate a composite image for one screen. This makes it possible to generate the composite image focused on each of the first and second subjects as shown in FIG. 11.

On the other hand, the distance information input unit 74 receives from the measurement unit 64 shown in FIG. 4 the distance information indicating the distances to the first and second subjects and the distance between the first and second subjects to output that distance information to the character generator 75. The character generator 75 generates a character information image (numerals indicating the distance) corresponding to the distance information on the basis of the received distance information to output the generated character information image to the image compositor 76.

The image compositor 76 superimposes on the composite image the character information image input from the character generator 75. As shown in FIG. 11, the character information image indicating the distances to the first and second subjects is preferably superimposed in the vicinity of the first and second subjects and the character information image indicating the distance between the first and second subjects is preferably superimposed at a middle position between the first and second subjects.

The composite image generated by the image compositor 76 is output via the external output terminal 32 (FIG. 2) to a wireless communication device in the mobile unit vehicle.

This allows a video to be taken in focus on both runners of the first subject (runner at the forefront) and the second subject (runner following the runner at the forefront) and allows numerical display of a gap (distance) between the runners, and therefore, if this image pickup apparatus 10 is mounted on the mobile unit vehicle covering a marathon race or relay road race live, the live coverage becomes interesting.

In the example shown in FIG. 11, the distances to the first and second subjects and the distance between the first and second subjects are displayed, but only any one of the distances may be displayed. These distances may be always displayed or may be displayed for a certain time period when the distance between the first and second subjects varies.

[Others]

In the example shown in FIG. 11, the distance between the first and second subjects and the like are superimposed and displayed on the composite image focused on each of the first and second subjects, but the present invention is not limited thereto. For example, the distance between the first and second subjects and the like may be superimposed and displayed on any one image of the image A shown in FIG. 8A and the image B shown in FIG. 8B.

In the embodiment, the runners in the marathon race or relay road race are described as examples of the first and second subjects each having a different focusing distance, but the present invention is not limited thereto and may be applied to image pickup of various subjects. The present invention is suitable for picking up images of the multiple subjects in which the distances to the multiple subjects individually vary.

The multiple subjects different in the focusing distance to be subjected to the focusing control may be specified by a user input such as tapping on the screen of the LCD 30 (e.g., LCD with touch panel).

Further, the focusing control for the multiple subjects different in the focusing distance is not limited to the contrast AF in the embodiment, but various AF such as phase-difference AF and the like may be applied.

It goes without saying that the present invention is not limited to the above described embodiments and various modifications may be made without departing from the spirit of the present invention.

What is claimed is:

1. A device for measuring distances to two subjects comprising:
   an imaging optical system including a lens divided into two physically-separated lens parts, two regions of the imaging optical system each having an independent focusing distance corresponding to a combination of the two physically-separated lens parts;
   a pupil orientation sensor having multiple pixels including photoelectric conversion elements arranged two-dimensionally, the pupil orientation sensor selectively receiving a light flux passed through any of the two regions;
   an image acquisition processor that simultaneously acquires each of two images corresponding to the two regions from the pupil orientation sensor;
   a focusing control processor that independently drives the two physically-separated lens parts of the imaging optical system on the basis of the two images acquired by the image acquisition processor to control the two physically-separated lens parts to be focused on two subjects each having a different focusing distance; and
   a first calculation processor that calculates each of the focusing distances to the two subjects respectively subjected to focusing control by the focusing control processor.

2. The device for measuring distances to two subjects according to claim 1, further comprising a second calculation processor that calculates a distance between the two subjects on the basis of the focusing distances calculated by the first calculation processor.

3. The device for measuring distances to two subjects according to claim 2, wherein
   the image acquisition processor simultaneously and successively acquires each of the two images corresponding to the two regions,
   the focusing control processor independently drives the two physically-separated lens parts of the imaging optical system on the basis of the two images corresponding to the two regions which are simultaneously and successively acquired by the image acquisition processor to control the two physically-separated lens parts to be successively focused on the two subjects,
   the first calculation processor successively calculates the focusing distances to the two subjects each successively subjected to the focusing control by the focusing control processor, and
   the second calculation processor successively calculates the distance between the two subjects on the basis of the focusing distances which are successively calculated by the first calculation processor.

4. The device for measuring distances to two subjects according to claim 1, further comprising a composite image generation processor that generates a composite image in which at least in-focus images of the two subjects are composited on the basis of the two images simultaneously acquired by the image acquisition processor from the pupil orientation sensor.

5. The device for measuring distances to two subjects according to claim 2, further comprising a composite image generation processor that generates a composite image in which at least in-focus images of the two subjects are composited on the basis of the two images simultaneously acquired by the image acquisition processor from the pupil orientation sensor, and superimposing, on the composite image, character information indicating the distance between the two subjects calculated by the second calculation processor.

6. The device for measuring distances to two subjects according to claim 1, further comprising
   a subject detection processor that detects a main subject from each of the two images simultaneously acquired by the image acquisition processor, wherein
   with assuming that each region containing each of the subjects detected by the subject detection processor and in the two images simultaneously acquired by the image acquisition processor is a focal point detection region, the focusing control processor independently drives the two physically-separated lens parts of the imaging optical system on the basis of an image of each focal point detection region to control the two physically-separated lens parts to be successively focused on the two subjects.

7. The device for measuring distances to two subjects according to claim 6, wherein the focusing control processor independently drives the two physically-separated lens parts of the imaging optical system such that a contrast of the image in each focal point detection region is maximized, and controls the two physically-separated lens parts to be successively focused on the two subjects.

8. The device for measuring distances to two subjects according to claim 1, wherein the first calculation processor has a lens position detection processor that detects lens positions of the two physically-separated lens parts which are independently driven by the focusing control processor so as to be brought into focus, and calculates the focusing distances to the two subjects on the basis of the lens positions of the two physically-separated lens parts detected by the lens position detection processor.

9. A method for measuring distances to two subjects comprising:

an image acquisition step of simultaneously acquiring each of two images corresponding to two regions from an image pickup device, the image pickup device having an imaging optical system including two physically-separated lens parts, two regions of the imaging optical system each having an independent focusing distance corresponding to a combination of the two physically-separated lens parts, and a pupil orientation sensor having multiple pixels including photoelectric conversion elements arranged two-dimensionally, the pupil orientation sensor selectively receiving a light flux passed through any of the two regions;

a focusing control step of independently driving the two physically-separated lens parts of the imaging optical system on the basis of the two images acquired in the image acquisition step to control the two physically-separated lens parts to be focused on two subjects each having a different focusing distance; and a first calculation step of calculating each of the focusing distances to the two subjects respectively subjected to focusing control in the focusing control step.

10. The method for measuring distances to two subjects according to claim 9, further comprising a second calculation step of calculating a distance between the two subjects on the basis of the focusing distances calculated in the first calculation step.

* * * * *